(12) United States Patent
Lindoff et al.

(10) Patent No.: US 7,953,028 B2
(45) Date of Patent: May 31, 2011

(54) METHODS AND APPARATUS FOR IMPROVED RECEIVER PERFORMANCE IN HALF-DUPLEX WIRELESS TERMINALS

(75) Inventors: Bengt Lindoff, Bjärred (SE); Sven Mattisson, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 664 days.

(21) Appl. No.: 12/099,945

(22) Filed: Apr. 9, 2008

(65) Prior Publication Data

US 2009/0180402 A1 Jul. 16, 2009

Related U.S. Application Data

(60) Provisional application No. 61/020,781, filed on Jan. 14, 2008.

(51) Int. Cl.
*H04B 7/00* (2006.01)
(52) U.S. Cl. ...................................................... 370/277
(58) Field of Classification Search .......... 370/275–282, 370/293–297, 328–339
See application file for complete search history.

(56) References Cited

U.S. PATENT DOCUMENTS

| | | | |
|---|---|---|---|
| 6,922,549 B2 * | 7/2005 | Lyons et al. ............... | 455/67.13 |
| 2002/0176375 A1 | 11/2002 | Barabash et al. | |
| 2003/0185167 A1 | 10/2003 | Paneth et al. | |
| 2004/0005913 A1 | 1/2004 | Bollenbeck | |
| 2007/0133498 A1 | 6/2007 | Nascimbene et al. | |
| 2007/0248057 A1 | 10/2007 | Keidar et al. | |
| 2007/0268848 A1 | 11/2007 | Khandekar et al. | |
| 2009/0011755 A1 * | 1/2009 | Hadad ....................... | 455/422.1 |

FOREIGN PATENT DOCUMENTS

| | | |
|---|---|---|
| EP | 1124337 | 8/2001 |
| WO | 20061106378 | 10/2006 |
| WO | WO 2006/106378 * | 10/2006 |
| WO | 20071048478 | 5/2007 |

OTHER PUBLICATIONS

Bacioccola, A. et al. "Bandwidth Allocation with Half-Duplex Stations in IEEE 802.16 Wireless Networks." IEEE Transactions on Mobile Computing, vol. 6, No. 12, Dec. 2007, pp. 1384-1397.

* cited by examiner

*Primary Examiner* — Frank Duong
(74) *Attorney, Agent, or Firm* — Coats & Bennett, P.L.L.C.

(57) ABSTRACT

A half-duplex mobile terminal having first and second receiver branches connected, during a receive mode, to respective antennas, is disclosed. One of the antennas is selectively connected to the first receiver branch or to a transmitter circuit. The first antenna is connected to the first receiver branch during a first interval, during which interval data is detected using outputs from both the first and second receiver branches. The first antenna is disconnected from the first receiver branch at the end of the first interval, and, during a second interval immediately following the first interval, data is detected using the output of the second receiver branch. A portion of the incoming transmission that arrives during the transition between the receive mode and transmit mode in a half-duplex transceiver is thus received and detected, improving performance of the half-duplex transceiver.

22 Claims, 9 Drawing Sheets

METHODS AND APPARATUS FOR IMPROVED RECEIVER PERFORMANCE IN HALF-DUPLEX WIRELESS TERMINALS

RELATED APPLICATION

This application claims priority under 35 U.S.C. §119(e) from U.S. Provisional Patent Application Ser. No. 61/020,781, which was filed on 14 Jan. 2008 and is entitled "Improved Reception Performance for Half Duplex Terminals."

TECHNICAL FIELD

The present invention generally relates to wireless communication devices and particularly relates to techniques for improving receiver performance in a half-duplex wireless terminal having multiple receiver branches.

BACKGROUND

Today's cellular phones and other wireless terminals often support two or more frequency bands (or frequency band pairs) and may also support two or more distinct cellular system standards. This is particularly true for mobile phones designed for international use, since frequency spectrum allocation remains un-harmonized throughout the world. This situation is exacerbated by the roll-out of new services on newly allocated frequency bands—mobile terminals designed for the new services must typically continue to support existing services on their corresponding frequency bands.

Support for multiple frequency bands typically requires duplication of several radio frequency (RF) components, such as filters. These RF filters are often among the bulkiest components in the mobile phone. In some cases, the performance requirements for RF filters are also very demanding, which in turn may increase the size of the filters, their cost, or both.

One approach to supporting several frequency bands in a mobile terminal is to allow only half-duplex operation in some of the bands. Half-duplex operation means that the mobile terminal does not support simultaneous transmission and reception. A key benefit of half-duplex operation is the easing of filtering requirements. In particular, a (typically large) duplex filter, with stringent requirements to prevent transmitter signals from desensitizing the receiver, is no longer required. Instead, a transmit/receive (T/R) switch is typically used, connecting a device antenna to the receiver in one state and to the transmitter in another. T/R switches are typically smaller and less expensive than a duplex filter.

Dispensing with the duplex filter has other benefits as well. For instance, a duplex filter generally has significant loss (signal attenuation), which decreases receiver sensitivity and requires the transmitter power amplifier output to be increased. Thus, half-duplex operation may provide improved receiver performance as well as improved power consumption, especially when the mobile terminal is operating at a high output power level.

However, switching between transmit and receive modes in a half-duplex transceiver requires a finite switching time, during which time the typical half-duplex transceiver can neither transmit nor receive. In a system where different frequencies are used for transmit and receive operations (a frequency-division duplex, or FDD, system), this switching time may include the time necessary to re-tune one or more local oscillators from a receive frequency to a transmit frequency. In many systems, this time is accounted for with a "guard time"—the system is designed around this gap in performance. Although the exact switching time for a given transceiver depends on the transceiver design details, this switching time may, in a high-bandwidth and/or high data-rate system, extend over several data symbols. Thus, the corresponding guard times preclude the most efficient possible use of the frequency spectrum by the half-duplex transceiver.

In the Long-Term Evolution (LTE) system currently under development by the 3rd-Generation Partnership Project (3GPP), mobile terminals may support either half-duplex or full-duplex operation. (Note that the LTE specifications provide for frequency-division duplexing, or FDD, as well as time-division duplexing, or TDD, systems. However, most systems are expected to be FDD.) As a result, a mixture of half- and full-duplex mobile terminals may be present in a given cell at any given time; the system design must accommodate this mixture.

One proposed approach for handling half-duplex terminals in LTE systems is to create an artificial guard time between receive and transmit modes by simply allowing the mobile terminal to ignore one or more of the last symbols in a sub-frame immediately preceding a mode change. In other words, the mobile terminal may begin switching slightly before the current sub-frame is completed, so that the terminal is ready to commence operation in the new mode at the beginning of the next sub-frame. An advantage of this technique is that it simplifies network design, since data is interleaved and transmitted in the same way for both half-duplex and full-duplex terminals. Complete loss of data is prevented by error correction (e.g., convolutional coding) and error detection/re-transmission schemes (e.g., hybrid ARQ). However, this solution will result in a degradation in throughput, perhaps similar to what might result from puncturing or increasing a redundancy coding rate. Depending on the coding rates used, this degradation could be significant. Thus, this previously proposed solution will degrade a half-duplex terminal's throughput as well as the overall capacity of the system.

SUMMARY

The performance degradation described above may be mitigated in a half-duplex mobile terminal having first and second receiver branches connected, during a receive mode, to respective antennas. A switch is controllable to selectively connect a first one of the antennas to the first receiver branch or to a transmitter circuit. A processing unit is configured to control the switch so that the first antenna is connected to the first receiver branch during a first interval, and to detect data from an incoming transmission during the first interval using outputs from both the first and second receiver branches. The processing unit is further configured to control the switch to disconnect the first antenna from the first receiver branch at the end of the first interval, and, during a second interval immediately following the first interval, to detect data from the incoming transmission using the output of the second receiver branch.

In various embodiments of the invention, then, the first antenna may be connected to a first receiver branch for a portion of an incoming transmission and connected to a transmitter circuit for data transmissions immediately following the incoming transmission. A portion of the incoming transmission that arrives during the transition between the receive mode and transmit mode may be received and detected by a second receiver branch, connected to a second antenna. Using this configuration, the detection performance of a half-duplex wireless transceiver may be enhanced.

In some embodiments of the invention, the processing unit may be further configured, when both receiver outputs are available, to detect data from the incoming transmission using maximal ratio combining of the first and second receiver branches. In some embodiments, the processing unit may be further configured to determine a switching time for disconnecting the first antenna from the first receiver branch, connecting the first antenna to the transmitter circuit, and initiating an outgoing transmission, and to initiate control of the first switch at a time based on this determined switching time and a projected start time for the outgoing transmission. The switching time may, in some embodiments, be determined as a function of an output power level for the outgoing transmission, or as a function of a currently used frequency band of two or more possible frequency bands, or both.

Various methods for processing received signals in a half-duplex wireless transceiver are also disclosed. In an exemplary method, at least a middle portion of an incoming transmission is received, during a first interval, using first and second antennas connected to first and second receiver branches, respectively. Data is detected from the middle portion of the incoming transmission using outputs from both of the receiver branches. At the end of the first interval, a switch is controlled to disconnect the first antenna from the first receiver branch. In some embodiments, this same switch is operable to connect a transmitter circuit to the first antenna. In any case, during a second interval immediately following the first interval, a final portion of the incoming transmission is received, using the second antenna and the second receiver branch, and data is detected from the final portion of the incoming transmission using the second receiver branch output.

Of course, the present invention is not limited to the above features and advantages. Those skilled in the art will recognize additional features and advantages upon reading the following detailed description, and upon viewing the accompanying drawings.

DETAILED DESCRIPTION

In the following description, the present invention is explained in the context of a mobile terminal operating in an FDD LTE system. As used herein, "mobile terminal" refers generally to equipment that communicates wirelessly with one or more base stations in a wireless communication system, e.g., those devices referred to as "User Equipment" or "UEs" by the 3GPP standards. Thus, a mobile terminal may include a hand-held telephone, a personal digital assistant (PDA) equipped with wireless functionality, a wireless card in a portable computer, a wireless transceiver module in an automobile, or the like. Furthermore, those skilled in the art will appreciate that the inventive techniques disclosed herein are not limited to a mobile terminal, or to an FDD LTE system, or to an LTE system at all, but may be applicable to half-duplex transceivers operating in a range of systems and configurations.

Figure 1:
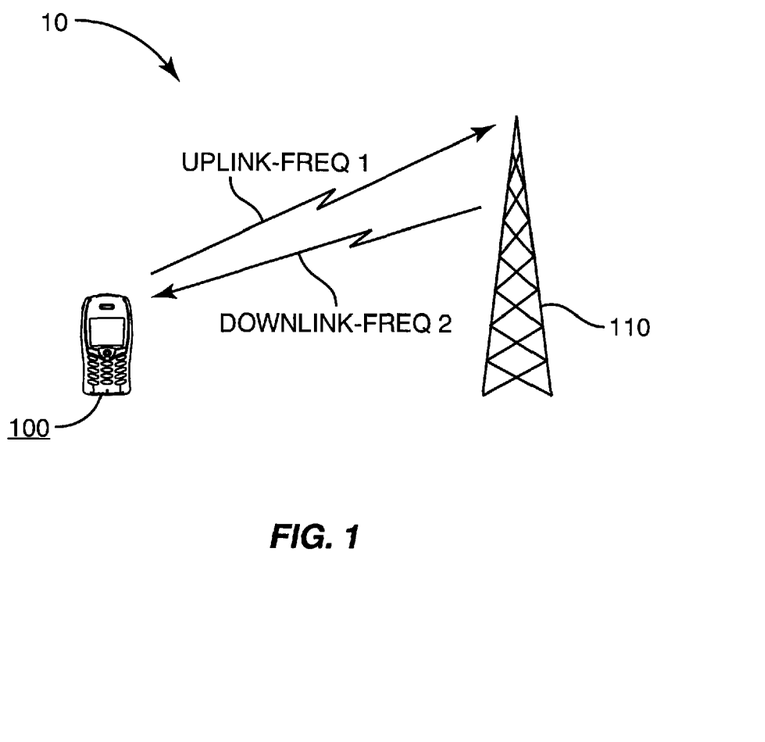
FIG. 1 illustrates an exemplary communication system.

Thus, FIG. 1 illustrates an exemplary mobile terminal 100 communicating with a base station 110 in a frequency-division duplexing (FDD) system 10. In the illustrated system, the uplink (comprising transmissions from mobile terminal 100 to base station 110) is at a first frequency, FREQ 1, while the downlink (comprising transmissions from base station 110 to mobile terminal 100) is at a second frequency, FREQ 2. In some embodiments, communication system 10 may comprise a Long Term Evolution (LTE) system as specified by the 3GPP.

Figure 2:
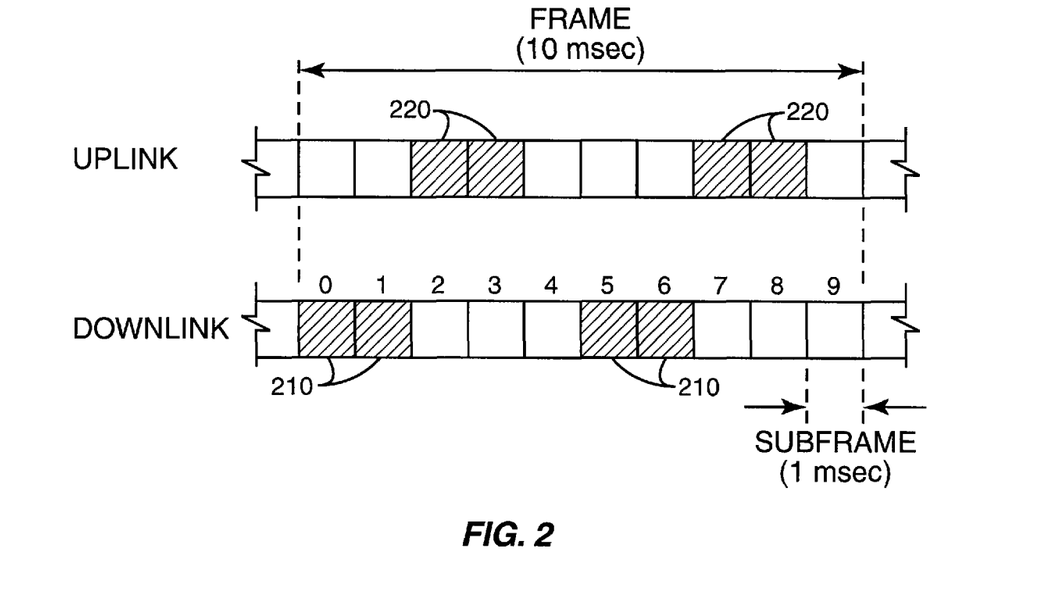
FIG. 2 illustrates an exemplary frame structure for an LTE system.

As noted above, LTE systems may support both half-duplex and full-duplex terminals. FIG. 2 illustrates an exemplary frame structure for an FDD LTE system, in which several sub-frames are allocated for use by a half-duplex mobile terminal. Those skilled in the art will appreciate that LTE systems allow dynamic scheduling of uplink and downlink resources. In particular, the uplink and downlink bandwidths, which may range from 1.25 MHz to 20 MHz, are divided into 15 kHz subcarriers, using Orthogonal Frequency Division Multiple Access (OFDMA) for the downlink and Single-Carrier Frequency Division Multiple Access (for SC-FDMA) for the uplink. In the time domain, a 10-millisecond frame comprises ten 1-millisecond frames, each sub-frame further comprising two 0.5-millisecond slots. Time-frequency resources are allocated, by a base station scheduler, in "resource blocks," defined as twelve contiguous subcarriers for one slot. In the pictured example, downlink subframes 210 are scheduled for sub-frames 0, 1, 5, and 6, while uplink sub-frames 220 are scheduled for sub-frames 2, 3, 7, and 8.

As discussed above, half-duplex transceivers may provide advantages in cost, size, and/or power consumption. However, in an FDD system, one drawback is that maximum allowed throughput for the transceiver is reduced, since it is impossible to allocate sub-frames simultaneously to the uplink and downlink. But, since LTE and other planned cellular systems support data rates up to and above 100 MB/s, half-duplex terminals are still capable of reaching high data rates, exceeding 20 MB/s in LTE, for example.

In LTE, full- or half-duplex operation depends on the mobile terminal, i.e., a given terminal is capable of either half- or full-duplex operation in a certain frequency band. Thus, a mixture of half- and full-duplex FDD terminals may be present in any given cell. When switching from downlink to uplink operation, an FDD half-duplex mobile terminal tunes to a different frequency. As noted above, the time for switching depends on the transceiver design details, but may be on the order of several OFDM symbols. This switching time is, of course, a limitation only for half-duplex terminals. Full-duplex terminals can receive and transmit simultaneously, as well as in directly contiguous sub-frames.

It has been proposed that LTE can accommodate half-duplex mobile terminals by simply allowing such terminals to ignore one or more of the last OFDM symbols in a downlink sub-frame immediately preceding an uplink transmission from that mobile terminal. Similarly, the mobile terminal could be permitted to drop the last SC-FDMA symbol or symbols in an uplink transmission immediately preceding a downlink sub-frame allocation for the mobile terminal. In both cases, hybrid ARQ and/or encoding may be relied upon to recover the dropped data.

Figure 3A:
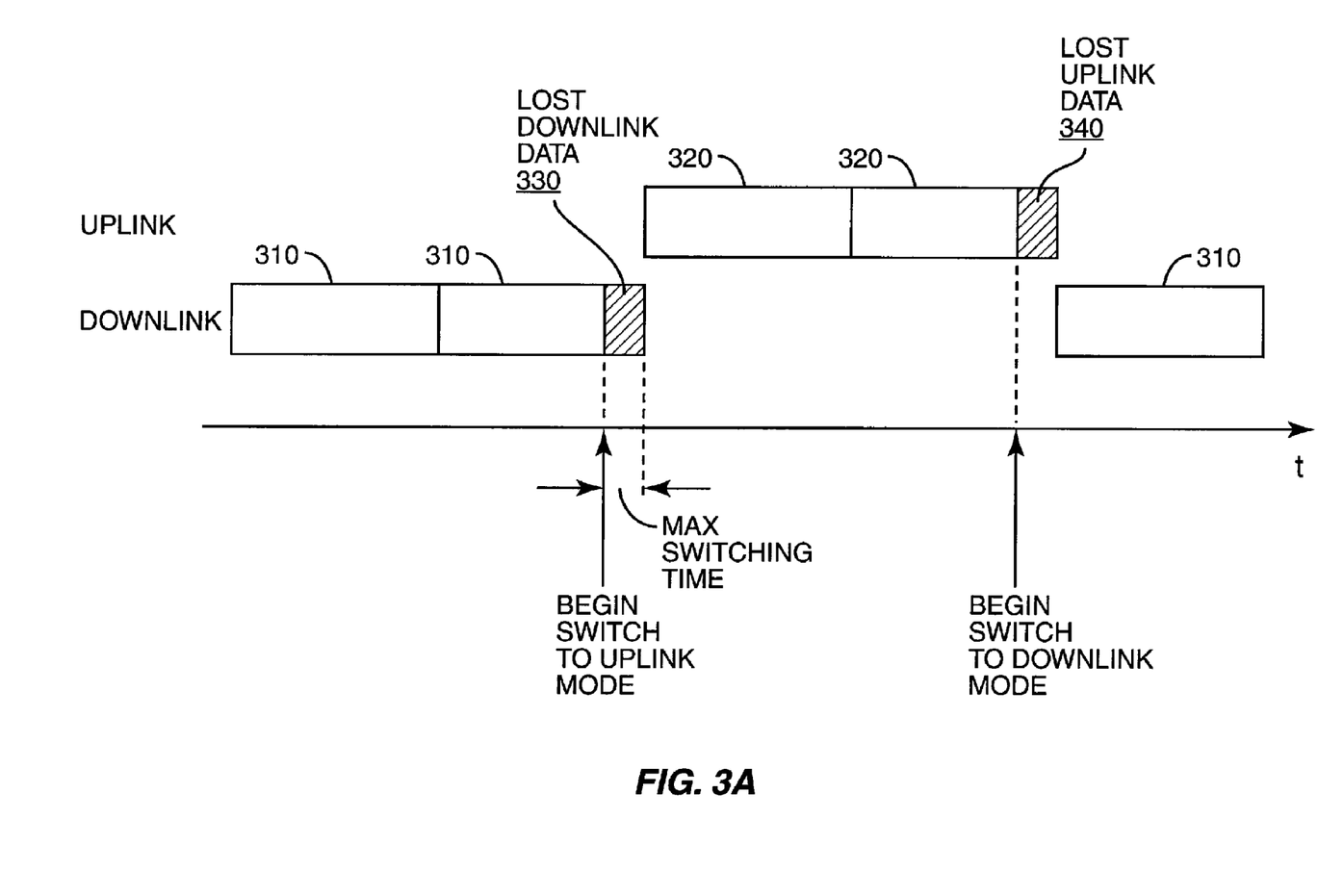
FIG. 3A illustrates the loss of uplink and downlink data due to switching time in a half-duplex transceiver.

This approach is illustrated in FIG. 3A, which illustrates several downlink sub-frames 310 and uplink sub-frames 320 allocated to a mobile terminal 100. Because the first uplink sub-frame 320 immediately follows a downlink sub-frame 310, the receiver must begin switching to uplink mode somewhat before the start of the uplink sub-frame 320. With this approach, the switching process should be initiated early enough to accommodate the maximum time required for completion of all of operations related to the mode change. Typically, these operations include controlling the transmit-receive (T/R) switch, which connects a device antenna to the receiver in downlink mode and to the transmitter in uplink mode, and re-tuning a local oscillator to a new frequency. Other operations, such as powering up one or more transmit-specific devices or frequency sources, may also be performed during this switching time interval.

During this switching time from uplink to downlink mode, the receiver is effectively inoperative, either because the antenna is disconnected, or because a local oscillator has been re-tuned, or both. Thus, one or more symbols from the downlink sub-frame may be lost, as shown at 330. A similar loss of symbols, but from an uplink sub-frame 320, is shown at 340. This loss is caused by the switching from uplink mode to downlink mode. This switching likewise causes the antenna to be disconnected from the transmitter circuitry, a local oscillator to be re-tuned, or both.

As noted above, the approach pictured in FIG. 3A will not always result in a complete loss of data, since error detection and correction protocols remain operative. However, this intentional dropping of symbols will generally result in throughput degradation compared to full-duplex operation.

Figure 3B:
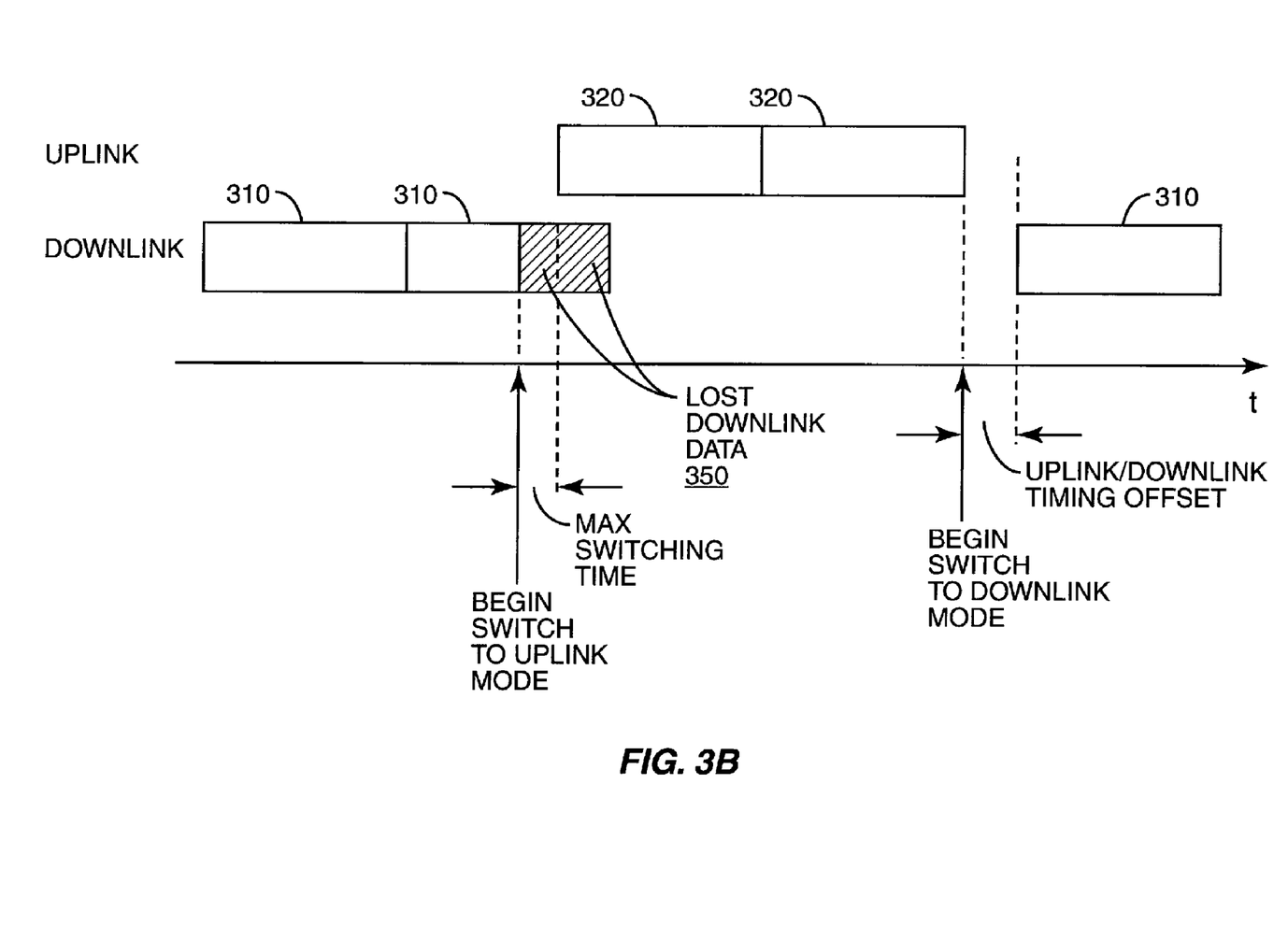
FIG. 3B illustrates the loss of downlink data in a half-duplex transceiver in a system employing offset uplink and downlink frames.

Another solution proposed for half-duplex operation in LTE systems is to introduce a time offset between the uplink and downlink frame structures, thereby creating a gap, or guard time, between uplink to downlink mode changes. This is illustrated in FIG. 3B, where a gap is shown between the uplink sub-frames 320 and the immediately succeeding downlink sub-frame 310. If the gap is long enough to accommodate the maximum mode switching time, then no symbols are lost in that mode change. However, an even longer loss of symbol data is then experienced at the downlink to uplink transition, as seen at 350 in FIG. 3B.

Figure 4:
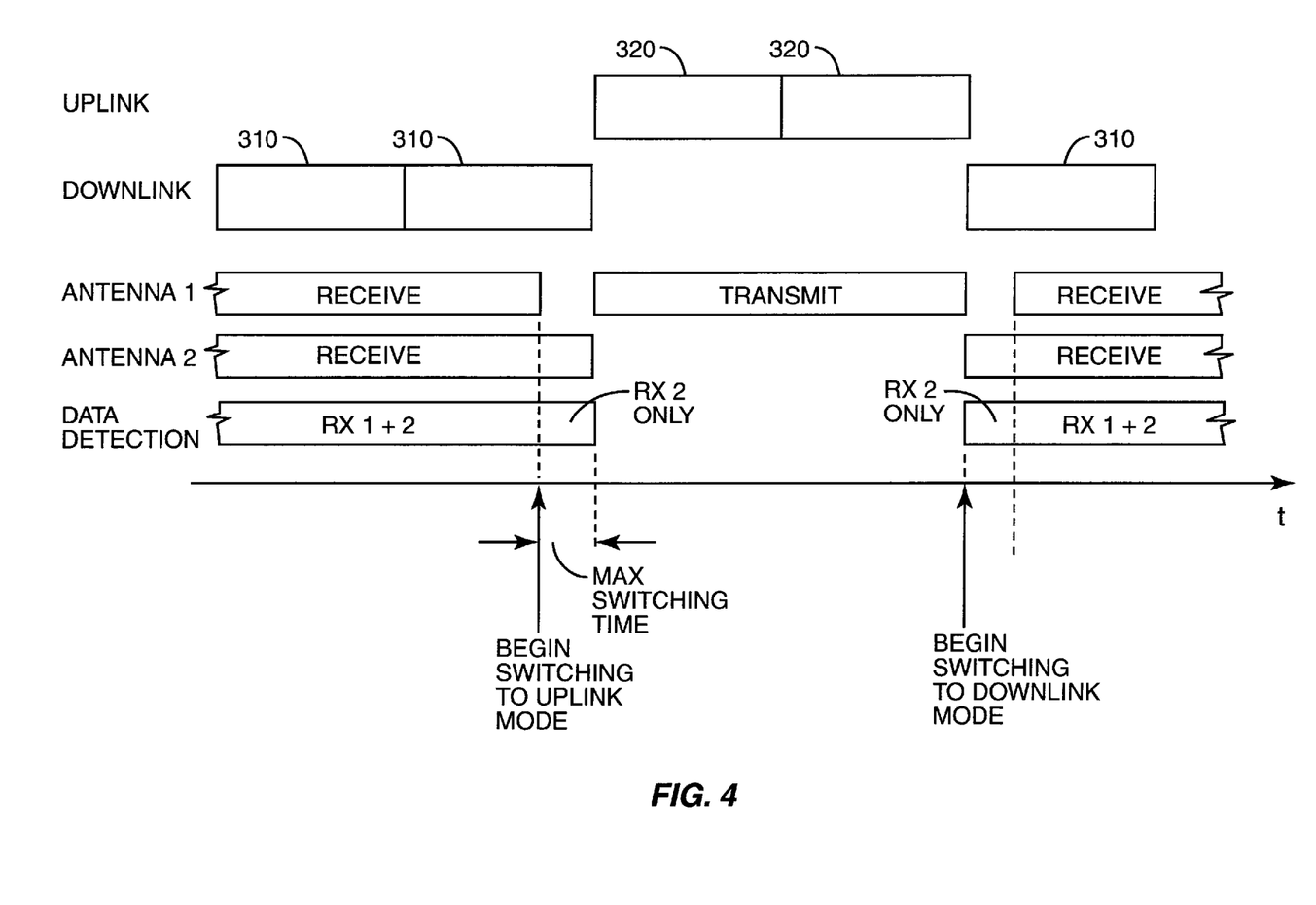
FIG. 4 illustrates the timing of operations in an exemplary half-duplex transceiver with two receiver branches.

The present invention mitigates the loss of symbol data illustrated in FIGS. 3A and 3B. FIG. 4 illustrates the operation of a transceiver configured according to the present invention wherein the transceiver has at least two receiver branches corresponding to two receive antennas. The receiver need only have one transmit antenna, which may be alternately connected to the transmitter circuitry and one of the receiver branches via a T/R switch.

FIG. 4 illustrates a series of successive sub-frames scheduled for a mobile terminal. Two downlink sub-frames 310 are immediately followed by two uplink sub-frames 320, which are in turn immediately followed by another downlink sub-frame 310. Given that the subject mobile terminal has two antennas, each antenna may be connected, during receive mode, to a separate receiver branch. Thus, data may be received simultaneously on both branches, at least for much of a given downlink transmission period. As will be discussed in more detail below, received signal data from two or more receiver branches may be advantageously combined to improve receiver performance.

One of the antennas, however, may be shared with the transmitter. Thus, as pictured in FIG. 4, antenna 1 is disconnected from its receiver branch and connected to transmitter circuitry, for transmission of uplink sub-frames 320. As was discussed above, the switching process begins early, i.e., before the completion of the second downlink sub-frame 310. As a result, the reception of data via antenna 1 is truncated, shortly before uplink transmission begins.

However, reception of data may continue on the second receiver branch, which remains connected to a second antenna. At least until the transmission of the uplink sub-frames 320 begins, the preparation and use of the transmitter circuitry need not interfere with the second receiver's operation at all. Those skilled in the art will note, however, that the receiver branch connected to antenna 2 must be capable of remaining tuned to the appropriate frequency even while the transmit circuitry is being prepared for a transmission. In practice, this may require the use of a separate local oscillator for the second receiver branch. This local oscillator may or may not be shared with the first receiver branch.

As can be seen from the FIG. 4, all or part of each downlink sub-frame is received using both receiver branches. This receiver diversity may be exploited to enhance link robustness by combining the outputs of the two receiver branches. Thus, as shown in FIG. 4, much of the data carried by the downlink sub-frame may be detected using both outputs. For instance, maximal rate combining (MRC) may be used to combine the two receiver outputs. As those skilled in the art will appreciate, two physically distinct antennas will have distinct channel impulse responses. The signals in each receiver branch may thus be separately compensated and linearly combined to create a single received signal. The received signals add coherently, while the thermal noise in each receiver, which is uncorrelated, does not. Thus, in a noise-limited environment, a two-channel MRC receiver may exhibit an improvement of 3 dB in signal-to-noise ratio (SNR).

Thus, the signals received over antennas 1 and 2 may be combined when both receivers are connected to the antennas. When antenna 1 is disconnected from its receiver, only the signal from the other receiver is used for data detection. Although the SNR is degraded during this later period, the result is better than having no signal at all.

A similar approach is pictured in FIG. 4 at the transition between uplink (transmit) mode and downlink mode. The entirety of the uplink sub-frames 320 are transmitted, even though a downlink sub-frame 310 is scheduled to immediately follow the uplink transmission. The independently operable receiver connected to antenna 2 receives the entire downlink sub-frame 310, with data available from the antenna 1 receiver branch only after the switching operations are completed. Again, data may be combined when available from both antennas, while data from the second receiver is used when the antenna 1 receiver branch is unavailable. When used along with conventional error encoding and hybrid ARQ schemes, the pictured approach may, in many signal environments, avoid, or significantly reduce, retransmissions caused by half-duplex operation.

As noted above, the length of the switch time required to complete a transition between receive and transmit modes is dependent on the actual transceiver design. In some cases, the required switch time may vary, depending, for example, on the required transmit power for a particular transmission (which may in turn depend on an amount of data to be transmitted, or a quality of service for the transmission). The switch time may also be driven by radio spectrum emission constraints (which may vary depending on the currently used frequency band). In various embodiments, the required switch time may be on the order of 10 to 200 microseconds. In LTE systems, this range corresponds to roughly one-half to three OFDM symbols. This switching time (whether constant for a given transceiver or as a function of operating conditions) may be determined ahead of time (e.g., at the time of manufacture) and stored in memory in the transceiver. Thus, some embodiments of the present invention may be configured to begin switching from receive to transmit modes at a fixed time offset prior to the beginning of the target mode.

Other embodiments may be configured to determine a switching time for disconnecting a first antenna from the first receiver branch, connecting the first antenna to the transmitter circuit, and initiating an outgoing transmission. In these embodiments, control of the switch may then be initiated at a time based on this determined switching time and a projected end time for the incoming transmission or start time for the outgoing transmission. Others may be configured to retrieve an offset from memory, which offset may vary depending on the operating conditions. Still others may be configured to calculate the offset as a function of the operating conditions, such as power level, frequency, and the like. Those skilled in the art will appreciate that the switching times for the receive-to-transmit transition may be the same as for the transmit-to-receive transition in some implementations. In others, however, these switching times may vary, and may be accounted for in the transceiver operation.

In some implementations, a function that processes received data obtained from the receiver branches is explicitly signaled when the first receiver branch is disabled. (In some embodiments, the same signal that controls the T/R switch to disconnect/re-connect the receiver may be used to signal a demodulation unit as to the current status of the receiver). The processing function in these embodiments may then be configured to ignore data from the disabled receiver. In other embodiments, a receiver branch may be configured to "mute" its output when disabled (as indicated, for example, by a signal from a control unit), perhaps by setting its output to zeros. A transceiver according to any of these implementations thus detects data using both receiver branch outputs when appropriate, and using only one receiver branch output when the other is disabled.

Figure 5:
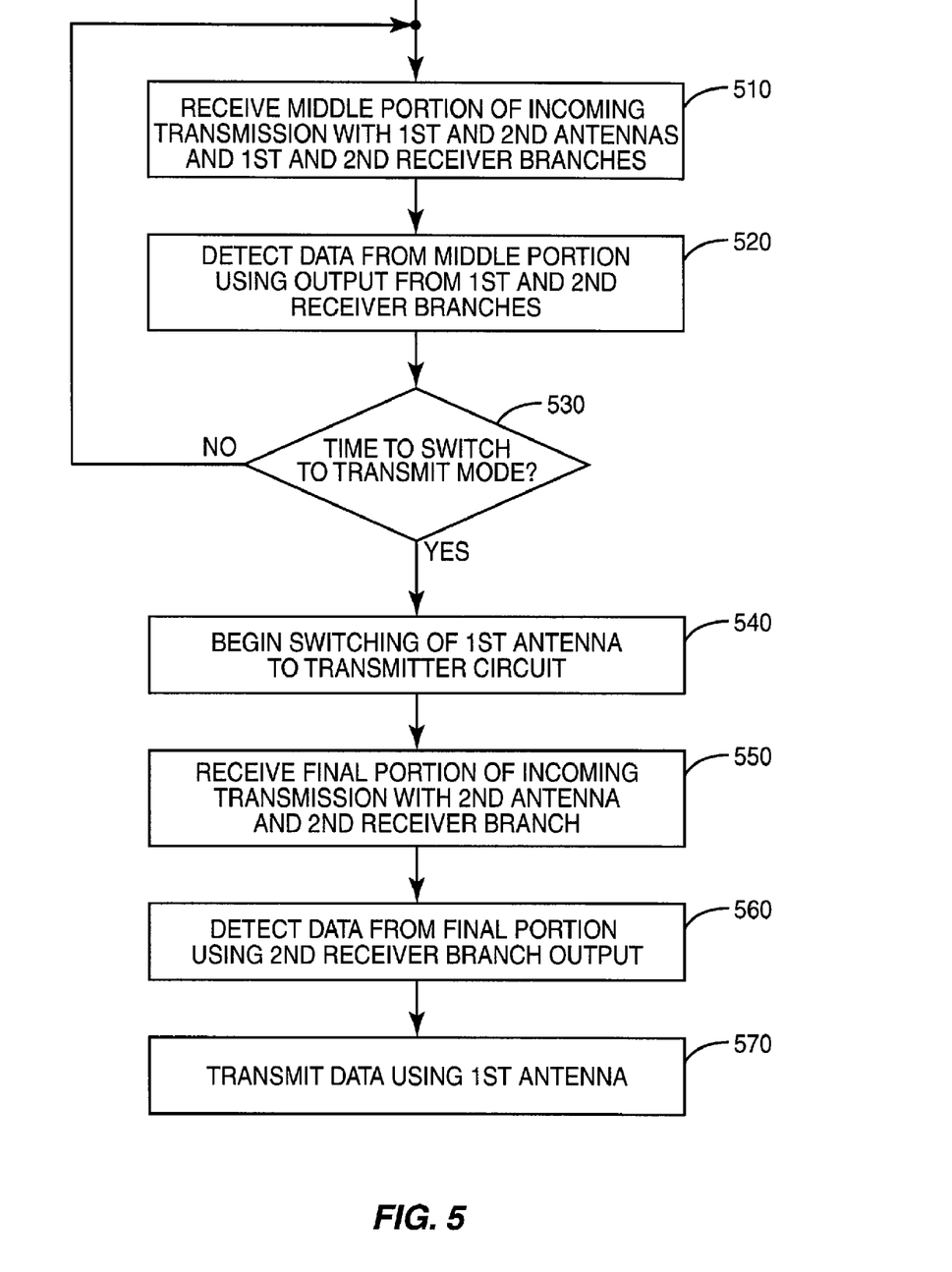
FIG. 5 is a logic flow diagram illustrating an exemplary method for processing received data in a half-duplex transceiver.

FIG. 5 illustrates an exemplary method for processing received signals, such as might be performed in a half-duplex receiver according to one or more embodiments of the invention. The method of FIG. 5 "begins" in receive mode, at block 510, where at least a middle portion of an incoming data transmission is received, using first and second antennas connected to first and second receiver branches, respectively. In embodiments implemented at a mobile terminal, the incoming transmission is a downlink transmission; in LTE systems this downlink transmission may comprise one or more contiguous slots or sub-frames. At block 520, data is detected from the received middle portion of an incoming data transmission using outputs from both of the first and second receiver branches. For example, as noted above, in some embodiments, receiver outputs from both of the receivers may be combined using maximal ratio combining. The receiver outputs may comprise soft symbol information, where the corresponding data is detected (and, in some embodiments, decoded) after combining.

At block 530, if it is time to switch from receive mode to transmit mode, then the switching process begins, as shown at block 540. If not, then more data is received and detected from the downlink transmission. As noted above, the time at which the switching process is initiated may be set at a fixed offset relative to the beginning of the anticipated uplink slot, or it may be determined as a function of the planned transmitter output power, the frequency band for the upcoming transmission, or other operating condition. In some embodiments, again as noted above, this determination of the switching time may comprise retrieving a pre-determined switching time from memory, perhaps based on one or more of the aforementioned operating conditions, or calculating the switching time based on one or more operating conditions.

In any event, the switching time defines an instant at which the switching process begins. In some embodiments, the switching process includes disconnecting the first antenna from the first receiver branch and connecting the first antenna to a transmitter circuit; this may involve one or several switch elements. In some embodiments, the switching process may also include re-tuning a local oscillator for use by the transmitter circuit and/or powering up one or more transmitter circuit elements.

Once the switching process is initiated, the output of the first receiver branch is generally unusable for detecting data. However, the final portion of the incoming transmission (i.e., the last portion before an outgoing transmission is sent) is received using the second antenna and the second receiver branch, as shown at block 550. Data for this final portion of the incoming transmission is detected using the second receiver branch output, ignoring the first receiver branch output, as shown at block 560. The first receiver branch output may be "ignored" using various techniques. For instance, some embodiments may mute the receiver output, so that its outputs are actually zero. In such an embodiment the receiver output may still be combined with the second receiver branch output, but with no effect. In other embodiments, a processing unit may be provided with a signal indicating that the first receiver output is not usable, so that the processing unit refrains from combining the first receiver output with the second receiver output.

At the appropriate time, an outgoing transmission is initiated, using the transmitter circuit and the first antenna, as shown at block 570. If the switching process is initiated early enough then the transmit circuit should be properly connected and local oscillators re-tuned, as necessary, prior to beginning the transmission.

The method illustrated in FIG. 5 describes a transition from a receive mode to transmit mode. A similar method may be applied to a transition from transmit mode to receive mode. This is pictured in FIG. 6.

Figure 6:
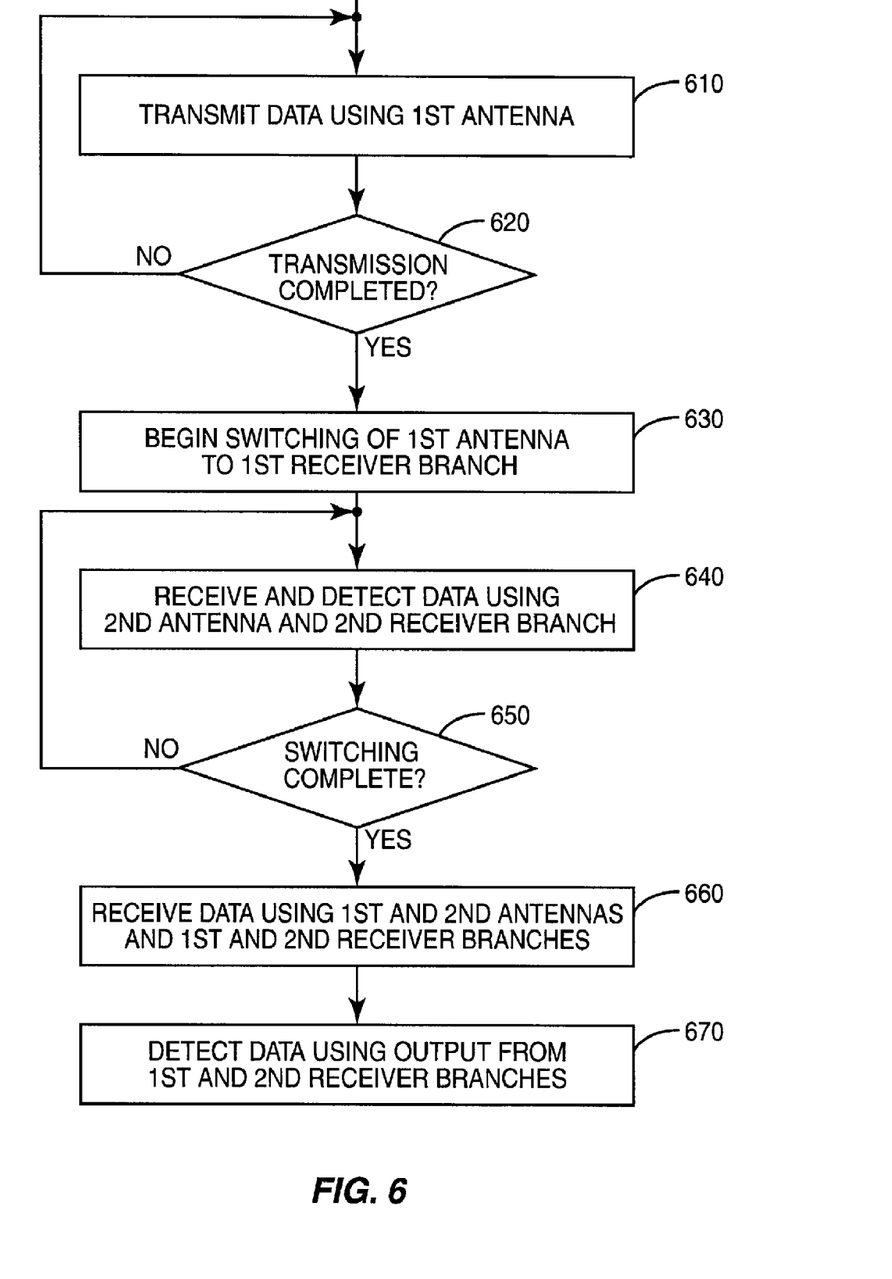
FIG. 6 is a logic flow diagram illustrating another exemplary method for processing received data in a half-duplex transceiver.

FIG. 6 begins, at block 610, with the transmission of data using a transmitter circuit connected to a first antenna. This transmission continues until the scheduled transmission interval is complete, as indicated at block 620, after which switching of the first antenna to the first receiver branch is initiated, as shown at block 630. As noted above, the switching time necessary to complete this transition may be the same as required for the receive-to-transmit transition, or it may differ. However, for this transition the switching time begins when the outgoing transmission is completed, and not ahead of time.

Because a subsequent incoming transmission may begin at or near the same instant as the outgoing transmission ends (and thus at or near the instant the switching process begins), the first receiver branch may not be operable during the first portion of the received transmission. For example, the first receiver branch may not be fully connected to the first antenna, or a local oscillator used for the first receiver branch may not be re-tuned, during this first portion. Thus, the first portion of the incoming transmission is received using a second receiver branch, connected to a second antenna. Data is detected from the incoming transmission using the output of this second receiver.

This continues until the switching is complete, as indicated at block 650. When the switching is complete, then the incoming transmission may be received using both the first and second receiver branches, via the first and second antennas, respectively, as shown at block 660. The output from both receivers may be used to detect the data, as shown at block 670.

Figure 7:
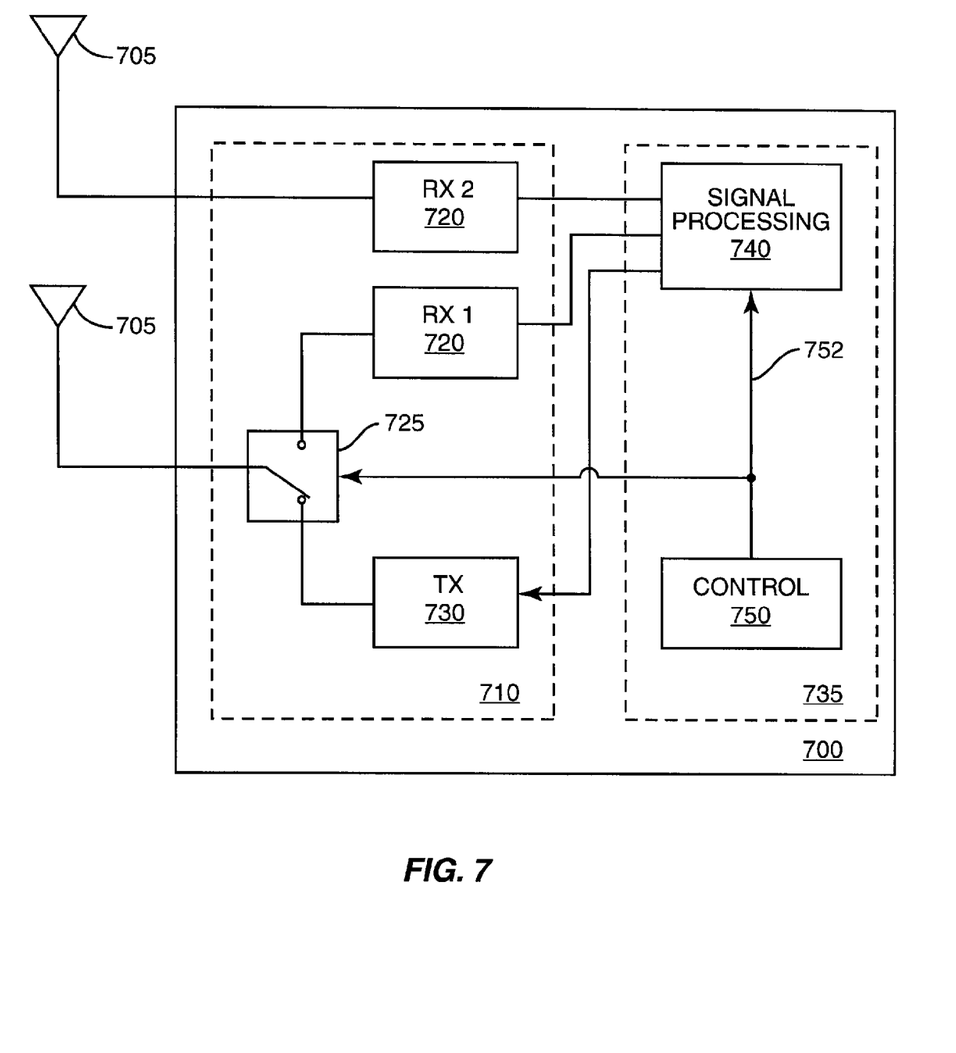
FIG. 7 is a block diagram for an exemplary half-duplex transceiver.

An exemplary half-duplex wireless transceiver 700 is illustrated in FIG. 7, and comprises a radio section including first and second receiver (RX) branches 720 and a transmitter (TX) circuit 730. The radio section further comprises a transmit/receive (T/R) switch 725 configured to alternately connect one of two antennas 705 to the first receiver branch 720 and the transmit circuit 730. The other antenna 705 is connected to the second receiver branch 720. The wireless transceiver 700 further comprises a processing unit 735, which includes a signal processing unit 740 and control unit 750.

The output from the first and second receiver branches 720 is provided to signal processing unit 740; signal processing unit 740 provides transmitter modulation data to transmitter circuit 730. Control unit 750 controls the T/R switch 725; the switch control signal 752 is also provided to signal processing unit 740, this signal indicates whether or not the second receiver branch 720 is functional.

Those skilled in the art will appreciate that the transceiver 700 of FIG. 7 may be configured to implement the methods described above in reference to FIGS. 5 and 6. Transceiver 700 may be part of a mobile terminal 100 configured for operation in any of a variety of wireless communication systems, such as a FDD LTE system. Transceiver 700 may be included in a multi-band and/or multi-standard wireless device, co-existing with one or more other half-duplex or full-duplex transceivers. In such an embodiment, some of the circuitry in the radio section 710, the signal processing unit 740, or the control unit 750 may be shared with one or more of these other transceivers.

The details of the receiver branches 720 and transmitter circuit 730 will vary according to the wireless standard. These details are well known to those skilled in the art and are not essential to a complete understanding of the present invention, and are thus not repeated here. In an embodiment configured for half-duplex operation in an LTE system, the receiver branches 720 and signal processing unit 740 are configured to receive and demodulate OFDMA signals, while the transmit circuit 730 and signal processing unit are configured to produce and transmit SC-FDMA signals. However, those skilled in the art will appreciate the applicability of the inventive concepts disclosed herein to receivers and transmitters of different types and according to different standards.

Each of signal processing unit 740 and control unit 750 may comprise one or more digital processing circuits, e.g., microprocessors/microcontrollers, digital signal processors, ASICs, FPGAs, etc. In some embodiments, all or parts of signal processing unit 740 and control unit 750 may be implemented on one or more shared digital processing circuits; in some embodiments one or more digital processing units may be shared by one or more functions of receivers 720 or transmitter circuit 730 and one or more functions of processing unit 735. As will be readily understood by those skilled in the art, several functions of the above-described invention may be implemented in hardware, software, or any combination thereof. For example, in one or more embodiments, processing unit 735 is implemented by configuring a digital processing circuit via stored computer program instructions held in a memory circuit or other storage element in or accessible to processing unit 735.

Figure 8:
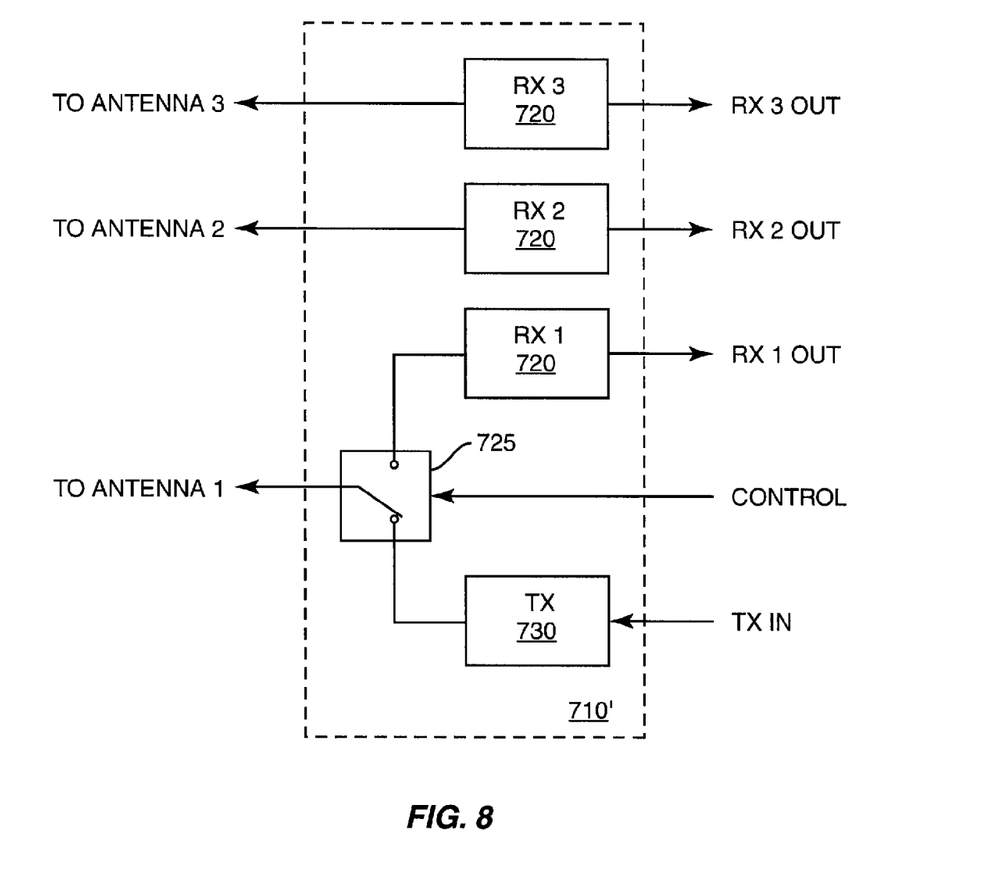
FIG. 8 is a block diagram illustrating an alternative radio section according to some embodiments of the invention.

Those skilled in the art will further appreciate that the inventive techniques described herein may be applied to half-duplex transceivers of different configurations than that pictured in FIG. 7. In particular, half-duplex transceivers according to the invention may include different numbers of receiver branches and antennas than shown in FIG. 7. For instance, FIG. 8 illustrates a radio section 710' that may be operated in accordance with one or more embodiments of the invention, radio section 710' including three separate receiver branches 720. A first receiver branch 720 is selectively connected to a first antenna via a T/R switch 725; a transmit circuit 730 is alternately connected to that same antenna. Two additional receiver branches 720 are each connected to their own respective antennas. Those skilled in the art will appreciate that the receiver outputs from the second and third branches may be used to detect data from incoming transmission when the first receiver is transitioning to or from receive mode. All three receiver outputs may be used to detect the incoming data otherwise.

Figure 9:
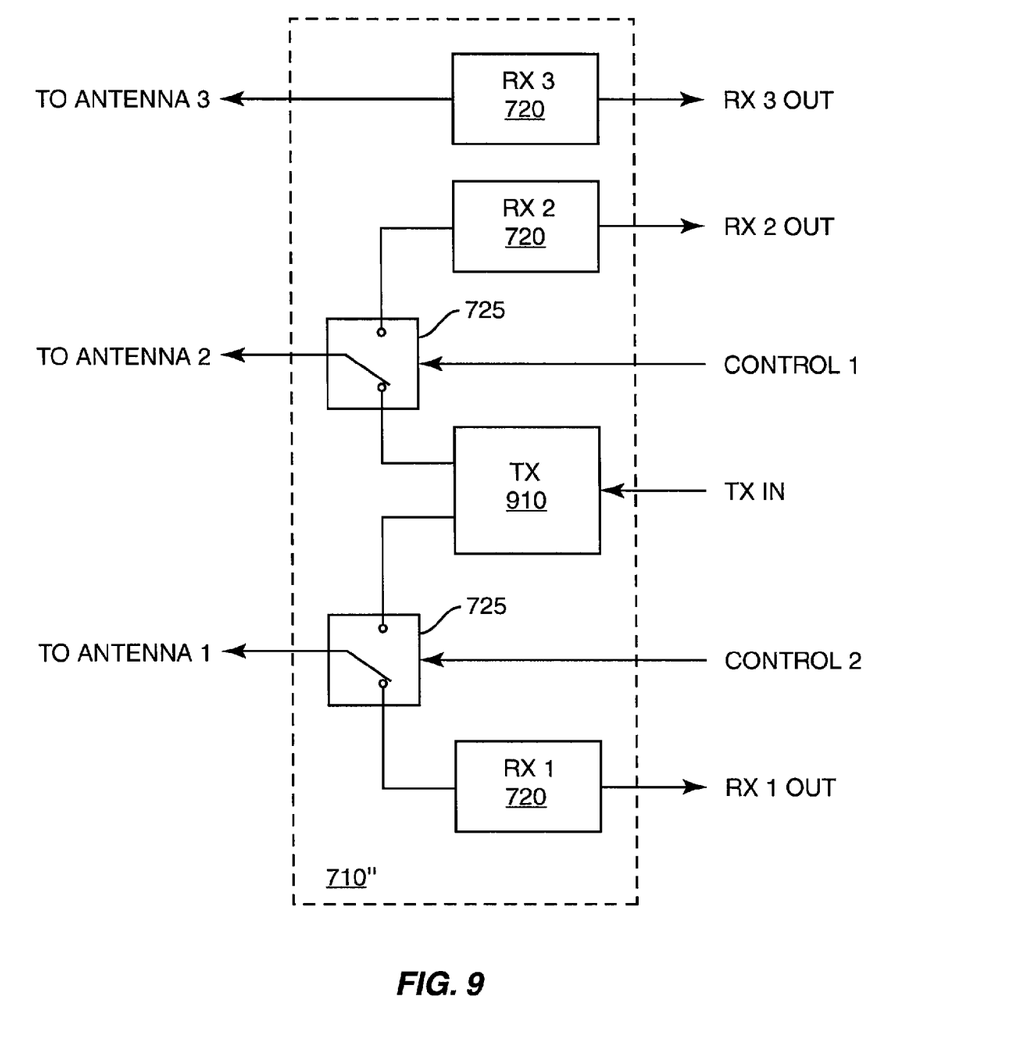
FIG. 9 is a block diagram illustrating another alternative radio section according to some embodiments of the invention.

Another configuration is shown in FIG. 9. In this embodiment, radio section 710'' also includes three receiver branches. However, in this configuration, the first and second receiver branches may be disconnected from their respective antennas, in favor of a diversity transmitter circuit 910. Thus, the transmitter circuit may employ two antennas during transmit mode. In some embodiments, diversity transmitter circuit 910 may simply provide the same signal to antennas 1 and 2 for transmission; in other embodiments diversity transmitter circuit 910 may support one or multiple-input-multiple-output (MIMO) technologies, such as space-time or spatial coding, such that different signals are provided to antennas 1 and 2. In any case, during the transition intervals, data may be detected using the output of the third receiver branch, which remains connected to its antenna. When all three receivers are operable and connected to their respective antennas, data from all three receiver outputs may be combined to detect the incoming data.

Of course, those skilled in the art will appreciate that the inventive techniques described herein may be applied to transceivers having more than three antennas. Indeed, as noted above, the illustrated methods and variations thereof may be implemented in transceivers of various configurations and supporting signals of various types. Similarly, other signal processing methods not explicitly illustrated in the drawings have been discussed above, and fall within the scope of the appended claims. Indeed, those skilled in the art will appreciate that the present invention may be carried out in other ways than those specifically set forth herein without departing from essential characteristics of the invention. The present embodiments are thus to be considered in all respects as illustrative and not restrictive, and all changes coming with the meaning and equivalency range of the appended claims are intended to be embraced within.

What is claimed is:

1. A method for processing received signals in a half-duplex wireless transceiver, comprising:

during a first interval, receiving at least a middle portion of an incoming transmission with a first antenna connected to a first receiver branch and a second antenna connected to a second receiver branch, and detecting data from the middle portion of the incoming transmission based on outputs from the first and second receiver branches;

at the end of the first interval, controlling a first switch to disconnect the first antenna from the first receiver branch; and during a second interval immediately following the first interval, receiving a final portion of the incoming transmission using the second antenna and the second receiver branch, and detecting data from the final portion of the incoming transmission based on the output from the second receiver branch.

2. The method of claim 1, further comprising, during a third interval immediately preceding the first interval:

receiving an initial portion of the incoming transmission using the second antenna and the second receiver branch;

detecting data from the initial portion of the incoming transmission based on the output from the second receiver branch; and controlling the first switch so that the first antenna is connected to the first receiver branch at or before the beginning of the first interval.

3. The method of claim 1, wherein detecting data from the middle portion of the incoming transmission based on outputs from the first and second receiver branches comprises combining the outputs using maximal ratio combining.

4. The method of claim 1, further comprising determining a switching time to disconnect the first antenna from the first receiver branch, connect the first antenna to a transmitter circuit, and initiate an outgoing transmission, wherein controlling the first switch comprises initiating control of the first switch at a time based on the determined switching time and a projected start time for the outgoing transmission.

5. The method of claim 4, wherein determining a switching time comprises retrieving a pre-determined switching time from memory.

6. The method of claim 4, wherein determining a switching time comprises determining the switching time as a function of an output power level for the outgoing transmission.

7. The method of claim 4, wherein determining a switching time comprises determining the switching time based on a currently used frequency band of two or more supported frequency bands.

8. The method of claim 1, wherein controlling the first switch to disconnect the first antenna from the first receiver branch comprises controlling the first switch to connect the first antenna to a transmitter circuit, the method further comprising, at the end of the second interval, controlling a second switch to connect the second antenna to the transmitter circuit.

9. The method of claim 1, further comprising receiving the middle portion and final portion of the incoming transmission using a third antenna connected to a third receiver branch, wherein detecting data from the middle portion is further based on an output from the third receiver branch and wherein detecting data from the final portion is further based on the output from the third receiver branch.

10. The method of claim 1, further comprising:

receiving the middle portion of the incoming transmission using a third antenna connected to a third receiver branch; and controlling a third switch to disconnect the third antenna from the third receiver branch and to connect the third antenna to a transmitter circuit;

wherein detecting data from the middle portion is further based on an output from the third receiver branch.

11. The method of claim 1, wherein the incoming transmission comprises one or more resource blocks transmitted by a Long-Term Evolution (LTE) eNodeB.

12. A half-duplex wireless transceiver comprising
first and second antennas,
first and second receiver branches,
a transmitter circuit,
a first switch controllable to selectively connect the first antenna to the first receiver branch or the transmitter circuit, and
a processing unit configured to:
control the first switch so that the first antenna is connected to the first receiver branch during a first interval;
during the first interval, detect data from at least a middle portion of an incoming transmission received by the first receiver branch, via the first antenna, and the second receiver branch, via the second antenna, based on outputs from the first and second receiver branches;
at the end of the first interval, control a first switch to disconnect the first antenna from the first receiver branch; and
during a second interval immediately following the first interval, detect data from a final portion of the incoming transmission received by the second receiver branch, based on the output from the second receiver branch.

13. The wireless transceiver of claim 12, wherein the processing unit is further configured to, during a third interval immediately preceding the first interval:

detect data from an initial portion of the incoming transmission received by the second receiver branch, based on the output from the second receiver branch; and control the first switch so that the first antenna is connected to the first receiver branch at or before the beginning of the first interval.

14. The wireless transceiver of claim 12, wherein the processing unit is configured to detect data from the middle portion of the incoming transmission by combining the outputs from the first and second receiver branches using maximal ratio combining.

15. The wireless transceiver of claim 12, wherein the processing unit is further configured to determine a switching time for disconnecting the first antenna from the first receiver branch, connecting the first antenna to a transmitter circuit, and initiating an outgoing transmission, and to initiate control of the first switch at a time based on the determined switching time and a projected start time for the outgoing transmission.

16. The wireless transceiver of claim 15, wherein the processing unit is configured to determine the switching time by retrieving a pre-determined switching time from a memory unit.

17. The wireless transceiver of claim 15, wherein the processing unit is configured to determine the switching time as a function of an output power level for the outgoing transmission.

18. The wireless transceiver of claim 15, wherein the processing unit is configured to determine the switching time based on a currently used frequency band of two or more supported frequency bands.

19. The wireless transceiver of claim 12, wherein the processing unit is further configured to control the first switch, at the end of the first interval, to connect the first antenna to the transmitter circuit, and to control a second switch, at the end of the second interval, to connect the second antenna to the transmitter circuit.

20. The wireless transceiver of claim 12, further comprising a third antenna and a third receiver branch configured to receive the middle portion and final portion of the incoming transmission, wherein the processing unit is configured to detect data from the middle portion further based on an output from the third receiver branch and to detect data from the final portion further based on the output from the third receiver branch.

21. The wireless transceiver of claim 12, further comprising a third antenna connected to a third receiver branch by a third switch, wherein the processing unit is configured to detect data from the middle portion of the incoming transmission further based on an output from the third receiver branch, and wherein the processing unit is further configured to control the third switch to disconnect the third antenna from the third receiver branch and to connect the third antenna to the transmitter circuit.

22. The wireless transceiver of claim 12, wherein the first and second antennas, first and second receiver branches, transmitter circuit, first switch, and processing unit are configured for operation in a Long-Term Evolution (LTE) wireless communications system supporting half-duplex and full-duplex transceivers.

* * * * *

UNITED STATES PATENT AND TRADEMARK OFFICE
CERTIFICATE OF CORRECTION

| | |
|---|---|
| PATENT NO. | : 7,953,028 B2 |
| APPLICATION NO. | : 12/099945 |
| DATED | : May 31, 2011 |
| INVENTOR(S) | : Lindoff et al. |

It is certified that error appears in the above-identified patent and that said Letters Patent is hereby corrected as shown below:

On the Title Page, in Field (56), under "FOREIGN PATENT DOCUMENTS", in Column 2, Line 2, delete "WO 20061106378 10/2006".

On the Title Page, in Field (56), under "FOREIGN PATENT DOCUMENTS", in Column 2, Line 4, delete "20071048478" and insert -- 2007/048478 --, therefor.

Signed and Sealed this
Eighteenth Day of October, 2011

David J. Kappos
*Director of the United States Patent and Trademark Office*